March 8, 1932.  L. A. BOOTH  1,848,931
BERMUDA GRASS PLOW
Filed Aug. 29, 1931  2 Sheets-Sheet 1
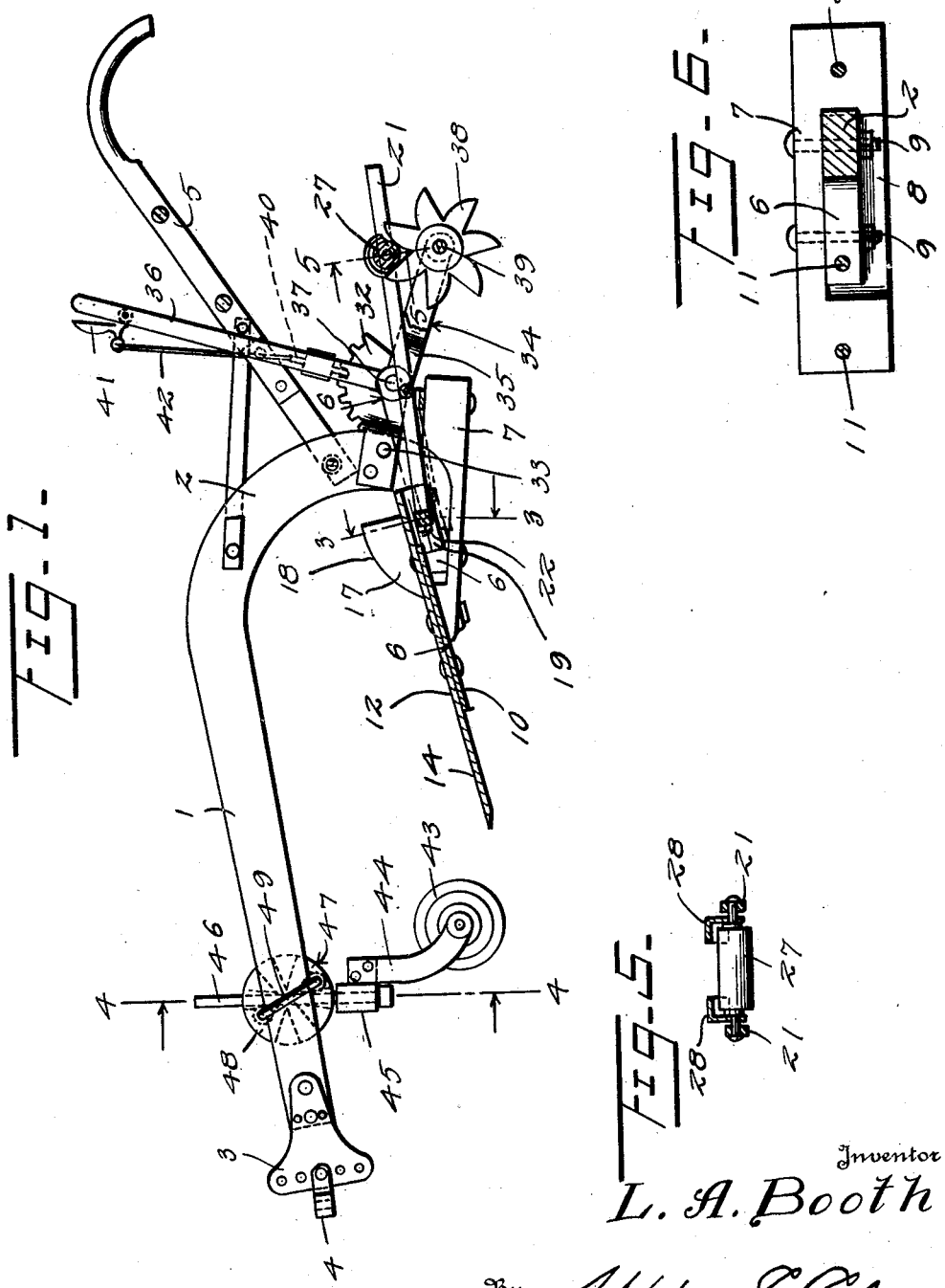
Inventor
L. A. Booth
By Watson E. Coleman
Attorney

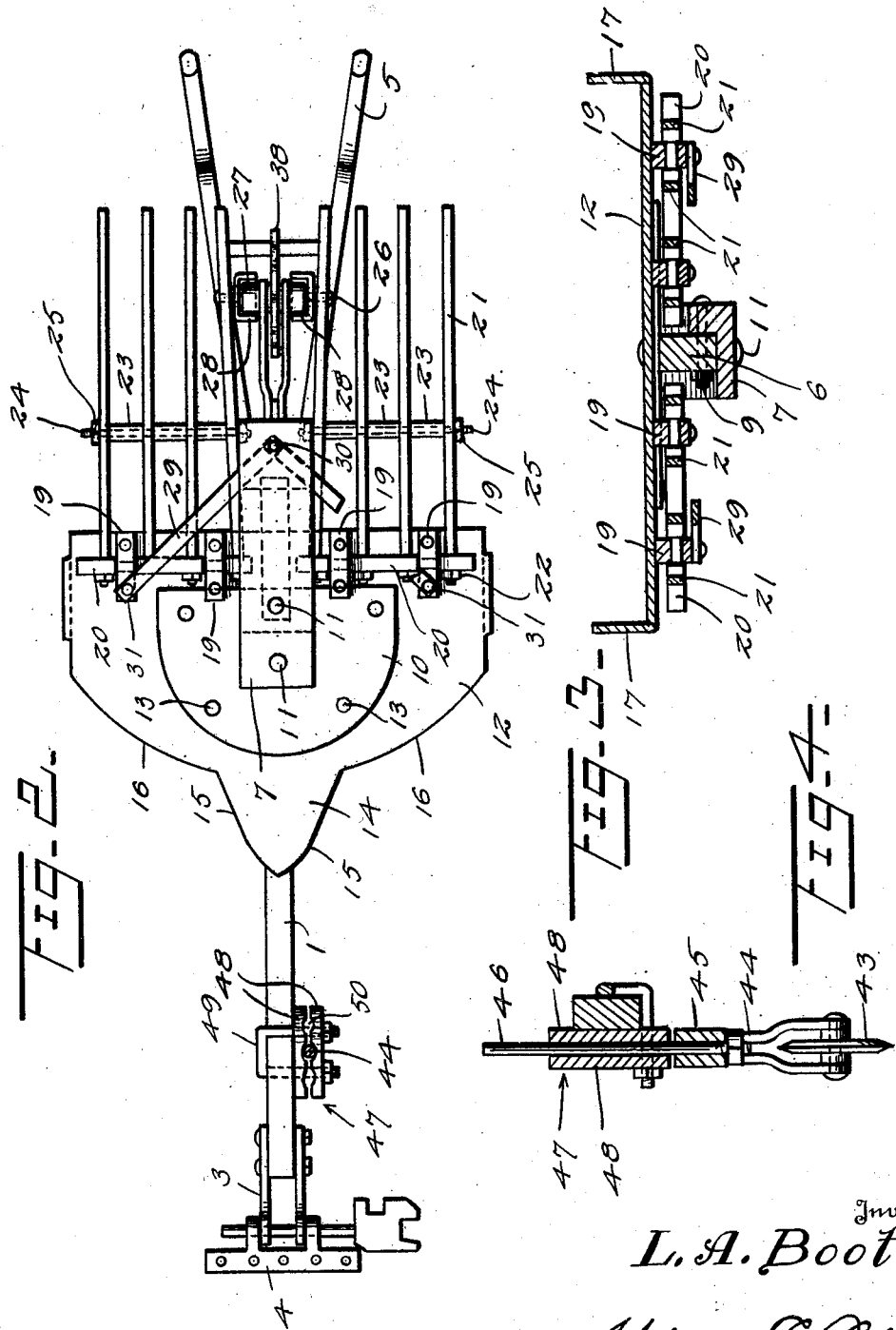

Patented Mar. 8, 1932

1,848,931

UNITED STATES PATENT OFFICE

LAWRENCE A. BOOTH, OF TYLER, TEXAS

BERMUDA GRASS PLOW

Application filed August 29, 1931. Serial No. 560,163.

This invention relates to a Bermuda grass plow, and has for one of its objects to provide a plow of this character which shall embody a flat blade having rearwardly diverging inner cutting edges and outwardly and rearwardly curved outer cutting edges and knives extending upwardly therefrom laterally beyond said last cutting edges, the cutting edges and knives adapting the blade to readily penetrate the soil and the roots of the grass.

The invention has for a further object to provide a plow of the character stated which shall embody rods pivoted to and extending rearwardly from the blade and over which the sod passes as it reaches the blade, a ground engaging tappet-wheel, and a roller carried by the rods and engaging the tappet-wheel to permit the rods to be rocked or vibrated by the tappet-wheel, the rocking or vibrating of the rods removing the soil from the sod passing over the bars.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view partly in vertical section and partly in side elevation of the plow.

Figure 2 is a bottom plan view of the plow.

Figure 3 is a sectional view taken on the planes indicated by the line 3—3 of Figure 1.

Figure 4 is a sectional view taken on the plane indicated by the line 4—4 of Figure 1.

Figure 5 is a sectional view taken on the plane indicated by the line 5—5 of Figure 1, and Figure 6 is a sectional view taken on the plane indicated by the line 6—6 of Figure 1.

The plow comprises a beam 1, a standard 2 extending downwardly from the rear end of the beam, a clevis 3 secured to the front end of the beam, a draft iron 4 secured to the clevis, and handles 5 secured to the beam and standard.

The lower end of the standard 2 is provided with a forwardly directed foot 6 having a downwardly and forwardly inclined upper side. A shoe 7 is secured to and extends forwardly and rearwardly beyond the foot 6, and the front portion of the shoe has a downwardly and forwardly inclined upper side located in alinement with the corresponding side of the foot. The shoe 7 is provided in its upper side with a recess 8 for the reception of the foot 6, and is secured to the foot by bolts 9. A plate 10 rests upon the inclined upper sides of the foot 6 and shoe 7, and is secured to these parts by bolts 11. The plate 10 extends forwardly and laterally beyond the foot 6 and shoe 7, and constitutes a reinforcing element for a flat blade 12 which rests upon the plate and is secured in place by the bolts 11 and rivets 13.

The blade 12 extends forwardly and laterally beyond the plate 10, and equal portions thereof are located at opposite sides of the longitudinal center of the plow. The blade 12 is provided at its front edge and centrally between its side edges with a forwardly directed extension 14 which tapers in the direction of its front end to provide rearwardly diverging cutting edges 15. The front edges of the blade 12 curve outwardly and rearwardly from the rear end of the extension 14 to provide convex cutting edges 16. The blade 12 is provided at its side edges with upwardly extending knives 17 which have upwardly and rearwardly curved cutting edges 18. The blade 12 and its extension 14 are coplanar, and are supported in a downwardly and forwardly inclined position. Due thereto, and in view of the rearwardly diverging inner cutting edges 15, the convex outer cutting edges 16 and the knives 17, the blade will readily cut through the soil and roots of Bermuda grass.

Bearings 19 are secured to the underside of the blade 12 near the rear edge of the latter. The bearings 19 are arranged in pairs at opposite sides of the foot 6 and shoe 7, and a shaft 20 is rotatably supported by each pair of the bearings. Bars 21 are secured to and extend rearwardly from the shafts 20. The front ends of the bars are reduced and screw-threaded and pass through the shafts 20. Nuts 22 mounted upon the screw-threaded ends of the bars 21 and contacting with the front sides of the shafts 20, and the shoulders formed by reducing the ends of the bars and contacting with the rear sides of the shafts, serve to secure the bars to the shafts. The bars 21 of each shaft are relatively spaced, and are maintained in spaced relation by collars 23. A rod 24 screw-threaded throughout its entire length passes through each group of the bars 21 and the spacing collars 23, and is held in place by nuts 25.

The innermost of the respective groups of bars 21 are connected by a shaft 26, and rotatably mounted upon the shaft between such bars is a roller 27. The ends of the roller 27 are protected by housings 28 carried by the shaft 26. Braces 29 extend from the upper side of the rear end of the shoe 7 to the underside of the blade 12, and are secured to these parts, as shown at 30 and 31, respectively. The braces 29 are located below the bars 21 and serve to limit the downward swinging or rocking movement of the bars.

A notched sector 32 is located rearwardly of the standard 2 and between the respective groups of bars 21, and is secured, as at 33, to the standard. An angular lever 34 is pivoted at the junctures of its arms 35 and 36 to the sector 32, the arm 35 extending downwardly and rearwardly from the pivot 37, and the arm 36 extending upwardly and rearwardly from the pivot. A tappet-wheel 38 is rotatably mounted, as at 39, upon the rear end of the lever arm 35. The roller 27 rests upon the tappet-wheel 38, and the tappet-wheel engages the ground, so as to effect the vibration of the bars 21 while the plow is in motion. The lever arm 36 is located between the handles 5 to arrange its upper end within convenient reach of the operator so that it may be rocked to raise the tappet-wheel 38 out of or lower it into engagement with the ground. A latch 40 carried by the lever arm 36 and engaging the notched sector 32 holds the lever against accidental movement so as to retain the tappet-wheel 38 in or out of engagement with the ground. A finger lever 41 pivoted to the lever arm 36 and connected to the latch 40 by a link 42, provides means through the medium of which the latch may be withdrawn from engagement with the notched sector 32 when the operator wishes to raise or lower the tappet-wheel 38.

A colter 43 located in advance of the blade 12, is carried by a fork 44 which is rotatably connected through the medium of a collar 45 to a shaft 46 secured to the beam 1 by a clamp 47. The clamp 47 comprises a pair of disks 48 secured to the beam 1 by a U-bolt 49 and provided in their opposing faces with grooves 50 for the reception of the shaft 46.

From the foregoing description, taken in connection with the accompanying drawings, it will be understood that the colter 43 will cut the sod in advance of the blade extension 14, and that the blade 12 will, due to its inclination, lift the sod which is cut at each side of the blade by the knives 17. The sod will pass from the blade 12 onto the bars 21 which will be rocked or vibrated by the tappet-wheel 38, resulting in the loosening of the soil from the sod.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. A plow of the character set forth, including a blade supported in a downwardly and forwardly inclined position, bars pivoted to and extending rearwardly from the blade, a pivoted lever, means normally holding the lever against movement, a ground engaging tappet-wheel journaled on the lever, and a roller journaled on the bars for engaging the tappet-wheel.

2. A plow of the character set forth, including a blade supported in a downwardly and forwardly inclined position, bars pivoted to and extending rearwardly from the blade, a notched sector, a lever pivoted to the sector and provided with a rearwardly extending arm and an upwardly extending arm, a ground engaging tappet-wheel journaled on the rearwardly extending lever arm, a roller journaled on the bars and engaging the tappet-wheel, and a latch carried by the upwardly extending lever arm and releasably engaged with the sector.

3. A plow of the character set forth, including a beam and a standard extending downwardly from the beam, a shoe secured to the lower end of the standard, a flat blade secured to the shoe in a downwardly and forwardly inclined position, the blade being provided at its center with a forwardly directed extension having rearwardly diverging side cutting edges, the blade being provided at opposite sides of its extension with outwardly and rearwardly curved cutting edges, knives extending upwardly from the blade laterally beyond said cutting edges thereof, bars pivoted to and extending rearwardly from the blade, a lever pivoted to and extending rearwardly from the standard, means holding the lever against accidental movement, a ground engaging tappet-wheel journaled on said lever, a roller carried by the bars and engaging the tappet-wheel, a colter located in advance of the blade, and means supporting the colter from the beam.

4. A plow of the character set forth, including a beam, a standard extending downwardly from the beam and provided with a foot, a shoe provided in its upper side with a recess receiving the foot, the shoe and foot being provided with inclined upper sides, a blade resting upon said sides of the foot and shoe and secured to said parts, bars pivoted to and extending rearwardly from the blade, a lever pivoted to and extending rearwardly from the standard, means securing the lever against accidental movement, a ground engaging tappet-wheel mounted on the lever, and a roller carried by the bars and engaging the tappet-wheel.

In testimony whereof I hereunto affix my signature.

LAWRENCE A. BOOTH.